UNITED STATES PATENT OFFICE.

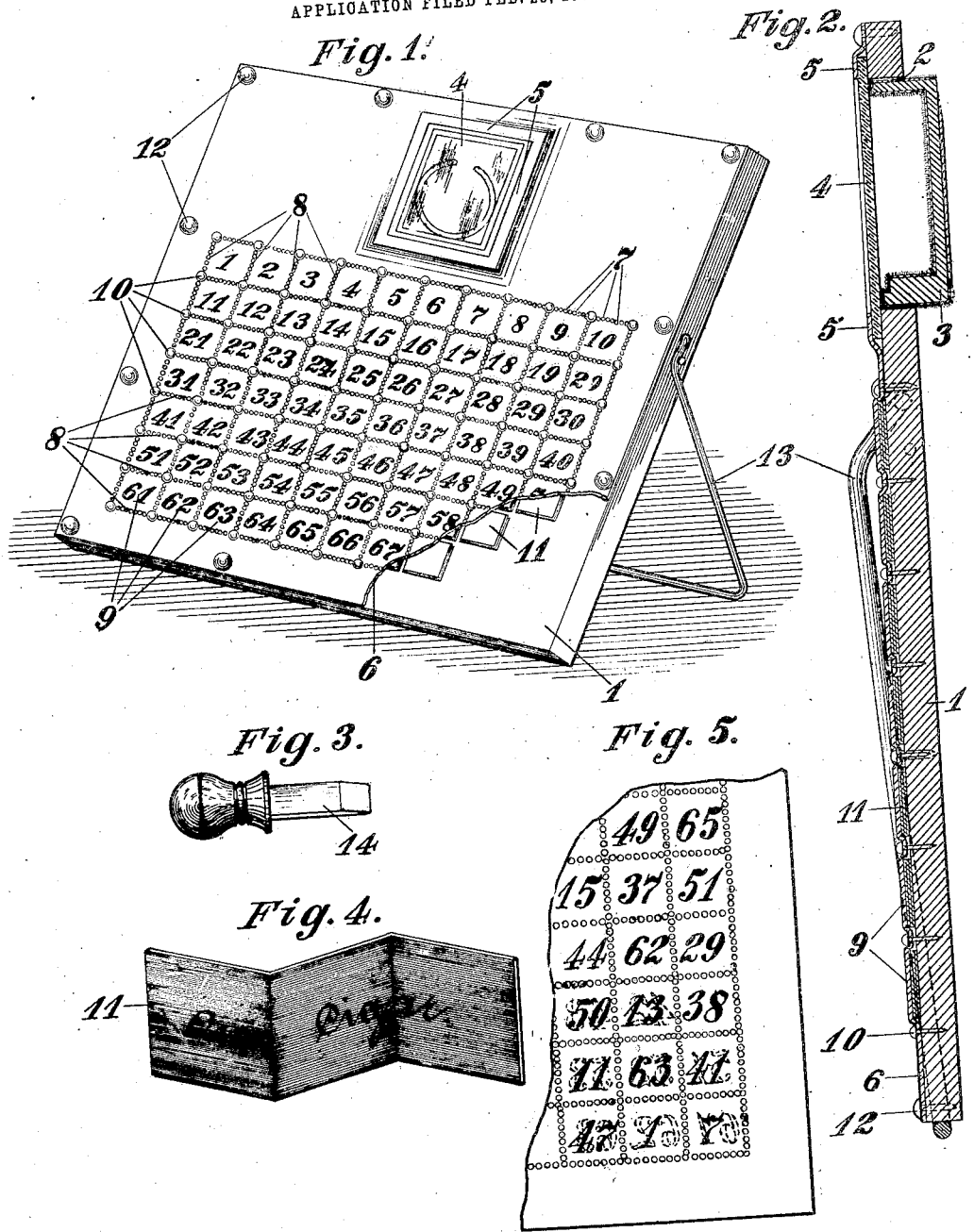

WILLIAM C. JOHNSON, OF ST. LOUIS, MISSOURI.

VENDING DEVICE.

No. 836,688.

Specification of Letters Patent.

Patented Nov. 27, 1906.

Application filed February 26, 1906. Serial No. 302,939.

*To all whom it may concern:*

Be it known that I, WILLIAM C. JOHNSON, a citizen of the United States, residing in the city of St. Louis and State of Missouri, have invented certain new and useful Improvements in Vending Devices, of which the following is a specification, reference being had therein to the accompanying drawings.

This invention relates in general to vending devices, although combining therewith the character of an advertising appliance.

The object for which the invention is principally designed is to promote the introduction and sale of merchandise, principally of that class which is retailed in separate pieces or packages at a uniform price per piece or package—such, for instance, as chewing-gum, cigars, &c.—and this is accomplished through a novel mode and instrumentality of advertising and vending a line of goods involving the sale of orders for the goods, accompanied by orders for a limited number of premiums or gifts that are distributed with the goods.

The form which has been chosen as the preferred mechanical embodiment of the invention consists generally of a receptacle composed of an imperforate board background and a perforated frangible sheet of rather strong material fastened thereto, there being thus formed between said sheet and said board a plurality of pockets or holders for written or printed order-slips or equivalent order mediums, which latter are confined within the respective pockets or other holders of the receptacle by said frangible retaining device, which serves entirely to conceal from sight the order itself, in association with an extracting device by which the orders may one at a time be removed from the receptacle.

In practice the receptacle itself will have prominently displayed thereon an announcement or advertisement of the goods for the sale of which it is instrumental, and the orders confined in the holders of the receptacle will call for a package or other fixed quantity of the article advertised, while a limited number of the holders may also contain orders for premiums or gifts, either separate articles or a certain value in trade. A customer will pay a certain sum—say five cents—for the privilege of extracting an order from the device, which order will call for at least a quantity of the goods advertised to the retail sale value of the price paid for the privilege and in some instances for a premium or a gift. Preferably and as herein shown and described the series of order holders or containers will be sealed, and the orders themselves will be obtainable on the part of the customers by extracting them from their sealed receptacles, after paying the price charged for the privilege, by means of the extractor, which breaks the frangible seal and removes the printed order-slips therefrom.

In the drawings, in which like numbers of reference denote like parts wherever they occur, Figure 1 is a perspective view of the device in operative form and position, partly broken away to show underlying parts. Fig. 2 is a longitudinal sectional view of the device in folded position. Fig. 3 is a detail perspective view of the extractor. Fig. 4 is a detail perspective view of an order-slip, and Fig. 5 is a fragmentary view of the underneath or reverse side of the frangible order-medium-concealing sheet.

The board 1 is solid and unperforated throughout, except for the single opening 2, which receives the box 3. Said box may contain a sample or samples of the merchandise to be sold by means of the above-mentioned order mediums or one of the separate articles constituting a premium or gift to which reference has hereinbefore been made. The contents of said box are plainly visible through the pane of glass 4, held in place by the use of adhesive material attaching same to the overlapping edges 5 of the perforated sheet 6, which in about the upper third of its surface is imperforate, so that it is adapted to receive advertisements thereon, this being true also of the edges surrounding the perforated portion. Said perforated portion is surrounded by a line of perforations 7, forming, for example, a rectangle. Said rectangle is divided by rows 8 of similar perforations running at right angles to each other into a plurality of squares or other geometrical forms 9, said squares bearing consecutive numbers "1, 2, 3, 4, 5," &c. A tack 10 or the like is driven through the sheet 6 at each corner of each square 9, thus converting each square 9 into a pocket, into which prior to tacking same to board 1 has first been inserted an order medium 11. This is accomplished by laying the board 1 flat, then arranging thereon slips 11 in folded form, as shown in Fig. 1, and carefully laying sheet 6 thereupon. A few tacks 12 and 10 quickly driven hold slips 11 and sheet 6 in proper relation to each other, after which the residue of both kinds of tacks can be easily driven.

A strut 13 holds the device in suitable display and operative position.

The blade of extractor 14 is kept sharp, and with it customers easily cut along at least one row of perforations 8 of one of the squares 9, which enables the insertion of said blade under such square and the tearing of same along the line of any remaining perforations and the removal of same and also of the slip 11 theretofore retained in place thereby.

From the foregoing it will be seen that the invention is essentially an order-vending device, although also adapted for the favorable display of advertising-matter.

The customer after having paid the price charged for the privilege of obtaining one or more orders cuts with the blade of the extractor 14 one or more of the rows of perforations surrounding a square 9 and then slips the blade of the extractor under said square and pressing thereon with his thumb removes same and also the order medium 11 found thereunder, which on being unfolded exposes to view the name of the article or goods to which he is entitled for his purchase-money. If the order extracted by him calls for a premium or gift, such premium or gift is delivered to him by the salesman or other person in charge of the device without further expense. It is to be understood that all of the squares 9 are loaded with orders, each one of which represents goods of the retail value of the price paid for the privilege of manipulating the device, whether containing an order for a premium or not.

It is evident that the mechanical features of the device as herein shown and described might be considerably modified in details without departing from the spirit and substance of the invention. Hence I do not limit the latter to the particular mechanical form illustrated and described, and for the rectangular forms herein mentioned circles or other geometrical forms may be substituted.

Instead of using order mediums like those herein designated 11 and illustrated in Figs. 1 and 4 the order mediums may consist simply of numbers printed in non-consecutive order on the reverse or underneath side of squares 9, as shown in Fig. 5, each number so printed constituting an order for a predetermined quantity or article varying (as hereinbefore described) according to a key or directions or an advertisement appearing on the face of the sheet 6.

Having thus described my said invention, what I claim, and desire to secure by Letters Patent, is—

1. In a device of the character described, the combination of a solid member and a frangible sheet attached thereto, said sheet containing a plurality of horizontal and a plurality of vertical rows of perforations, whereby the same is divided into squares, and tacks attaching each of said squares to said solid member, whereby a pocket is formed between said square and said solid member.

2. In a device of the character described, the combination of a solid member and a frangible sheet attached thereto, said sheet containing a plurality of horizontal and a plurality of vertical rows of perforations, whereby the same is divided into squares, and tacks attaching each of said squares to said solid member, whereby a pocket is formed between said square and said solid member, and an order medium located in each of said pockets.

3. In a device of the character described, the combination of a back and a frangible sheet divided by means of perforations into a plurality of geometrical forms, said forms being consecutively numbered on the outer side, and irregularly numbered on the inner side, said inner numbers constituting an order medium, and said frangible sheet being so attached to said back as to conceal the number indicated on the inner side thereof.

4. In a device of the character described, the combination, with a solid background, of a frangible sheet divided by rows of perforations into a plurality of geometrical forms, tacks driven through said frangible sheet at each of the intersections formed by said rows of perforations, thereby attaching each of said geometric forms to said solid background, whereby a pocket is formed between said forms and said solid member, and an order medium located in each of said pockets.

5. In a device of the character described, the combination of a back and a frangible sheet divided by means of perforations into a plurality of independently-removable geometrical forms, said forms being consecutively numbered on the outer side and irregularly numbered on the inner side, and means for attaching said frangible sheet to said back so as to conceal the numbers on the inner side thereof.

6. In a device of the character described, the combination of a solid member and a frangible sheet attached thereto, said sheet containing a plurality of horizontal and a plurality of vertical rows of perforations, whereby the same is divided into squares, securing means attaching each of said squares to said solid member whereby a pocket is formed between said square and said solid member, and an order medium concealed in each of said pockets.

7. In a device of the character described, the combination with a background of a frangible sheet divided by rows of perforations into a plurality of squares, means securing each corner of each of said squares to said solid background, whereby a pocket is formed between each of said forms and said solid member, and an order medium concealed in each of said pockets.

In testimony whereof I have affixed my signature in presence of two witnesses.

WILLIAM C. JOHNSON.

Witnesses:
ELLIOTT R. GOLDSMITH,
G. WALTON.